United States Patent
Akiyoshi et al.

(10) Patent No.: US 8,679,228 B2
(45) Date of Patent: Mar. 25, 2014

(54) METHOD OF REUSING HYDROGEN

(75) Inventors: Ayao Akiyoshi, Shunan (JP); Tadashi Aimoto, Shunan (JP)

(73) Assignee: Tokuyama Corporation, Shunan-Shi (JP)

(*) Notice: Subject to any disclaimer, the term of this patent is extended or adjusted under 35 U.S.C. 154(b) by 46 days.

(21) Appl. No.: 13/390,018

(22) PCT Filed: Sep. 13, 2010

(86) PCT No.: PCT/JP2010/065705
§ 371 (c)(1),
(2), (4) Date: Feb. 10, 2012

(87) PCT Pub. No.: WO2011/040214
PCT Pub. Date: Apr. 7, 2011

(65) Prior Publication Data
US 2012/0137881 A1 Jun. 7, 2012

(30) Foreign Application Priority Data

Sep. 30, 2009 (JP) ................................ 2009-226629
Dec. 3, 2009 (JP) ................................ 2009-275687

(51) Int. Cl.
*B01D 53/02* (2006.01)

(52) U.S. Cl.
USPC .................................................. 95/92; 95/93

(58) Field of Classification Search
USPC ........................................... 95/92, 93
See application file for complete search history.

(56) References Cited

FOREIGN PATENT DOCUMENTS

| EP | 0 216 292 A1 | 4/1987 |
| JP | 2006-131491 A | 5/2006 |
| JP | 2008-143776 A | 6/2008 |

OTHER PUBLICATIONS

Translation of JP 2006-131491 A.*
International Search Report for PCT/JP2010/065705 dated Oct. 5, 2010.
"Absorption of tri-and tetrachlorosilane by aqueous solutions," Chemical Abstracts, Jan. 1, 1989, vol. 111, No. 16, 136848A.
Extended European Search Report for Appl. No. 10820333.2 dated Sep. 26, 2013.

* cited by examiner

*Primary Examiner* — Christopher P Jones
(74) *Attorney, Agent, or Firm* — Birch, Stewart, Kolasch & Birch, LLP

(57) ABSTRACT

The invention recovers highly pure hydrogen from the exhaust purge gas and reuses it as a hydrogen source in other production steps contributing to greatly reducing the disposal cost and the cost of producing polysilicon. The hydrogen chloride contained in the exhaust gas discharged from the step of depositing polysilicon by using trichlorosilane, is adsorbed by active carbon. The active carbon layer is then purged with the hydrogen gas, and the adsorbed hydrogen chloride is desorbed. Next, the exhaust purge gas is brought into contact with a hydrogen chloride-absorbing solution such as an aqueous solution of sodium hydroxide to remove the hydrogen chloride from the exhaust purge gas and to separate and recover the highly pure hydrogen gas. The recovered hydrogen gas is compressed and is fed as a hydrogen source to other steps of producing, for example, fumed silica.

4 Claims, 1 Drawing Sheet

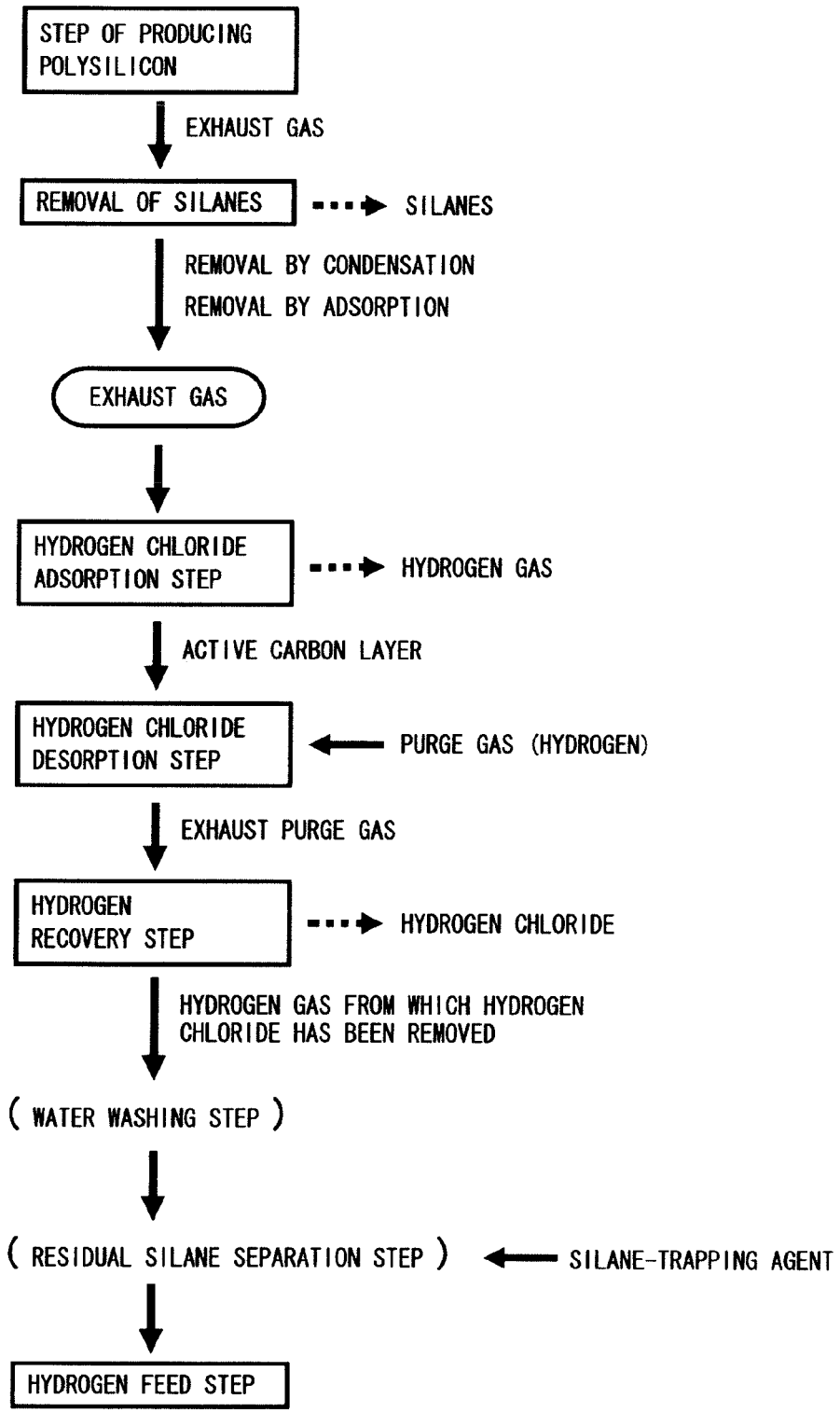

METHOD OF REUSING HYDROGEN

TECHNICAL FIELD

This invention relates to a method of reusing hydrogen in a step of producing polysilicon by reacting hydrogen with a trichlorosilane.

BACKGROUND ART

A variety of methods have heretofore been known for producing silicon that is used as a starting material of a semiconductor or a wafer for solar power generation and, among them, some methods have been already put into practical use on industrial scales. For example, one of them is a method called Siemens' method according to which a mixed gas of hydrogen and a trichlorosilane is fed onto a filament that is heated by flowing an electric current, and the polysilicon is obtained by depositing silicon on the filament relying on the chemical vapor phase deposition method. The exhaust gas discharged from the step of producing the polysilicon based on the Siemens's method contains hydrogen, unreacted trichlorosilane and silane compounds such as monosilane, monochlorosilane, dichlorosilane and tetrachlorosilane which are by-products of the reaction, as well as hydrogen chloride. In the invention, hereinafter, the trichlorosilane and the silane compounds are referred to generally as silanes.

In the process for producing the polysilicon based on the Siemens' method, it is a practice to separate the gaseous components contained in the exhaust gas and recirculate them into the production of the polysilicon. For instance, a patent document 1 discloses a method of producing the polysilicon in which the exhaust gas containing hydrogen chloride by-produced in the step of producing the polysilicon is passed through the following steps; i.e., cooled down to −10° C. or lower to remove part of silanes by condensation, the exhaust gas that has passed through the above step is passed through an active carbon layer to remove silanes in the exhaust gas by adsorption, and the exhaust gas that has passed through the step of removal by adsorption is passed through an active carbon layer having a specific average pore radius to remove hydrogen chloride by adsorption thereby to refine hydrogen in the exhaust gas, and the thus obtained hydrogen is circulated into the step of producing the polysilicon.

According to the above proposed method, the hydrogen chloride is desorbed, by using hydrogen as a purge gas, from the active carbon layer that has adsorbed and held the hydrogen chloride in the step of removing the hydrogen chloride by adsorption. Thereafter, the exhaust purge gas containing hydrogen and the desorbed hydrogen chloride is brought into contact with the acid water such as of hydrochloric acid in a washing tower so that the hydrogen chloride in the exhaust purge gas is absorbed by the acid water, and then the hydrogen chloride is recovered from the acid water.

PRIOR ART DOCUMENT

Patent document 1: JP-2006-131491A

OUTLINE OF THE INVENTION

Problems that the Invention is to Solve

In the above patent document 1, the exhaust gas discharged after the exhaust purge gas is brought into contact with the acid water in the washing tower contains hydrogen as a chief component and, further, contains impurities that can be little absorbed by the acid water such as of hydrochloric acid, i.e., contains methane ($CH_4$) phosphine ($PH_3$) as well as trace amounts of hydrogen chloride dissolved in the water content that flows out from the washing tower accompanying the exhaust gas. Therefore, it had been considered that the exhaust gas could not be used as a hydrogen source for the other reactions, and the exhaust gas was so far disposed of through a suitable treatment.

On the other hand, an increase in the amount of the polysilicon produced by the Siemens's method is accompanied by an increase in the amount of the exhaust gas from the step of producing the polysilicon. The active carbon layer has a limit in its capability for removing the hydrogen chloride by adsorption. Therefore, a plurality of the active carbon layers have been used arranged in parallel to cope with the increase in the amount of the exhaust gas. However, use of the active carbon layers in many number results in an increased frequency for regenerating the active carbon layers that have adsorbed the hydrogen chloride, i.e., results in an increased frequency for desorbing the hydrogen chloride from the active carbon layers using hydrogen as a purge gas causing, accordingly, an increase in the amount of the exhaust purge gas discharged at the time of desorbing the hydrogen chloride. Accordingly, it has been desired to establish a method of effectively reusing the exhaust gas. Here, the active carbon from which the hydrogen chloride is desorbed can be used again for removing the hydrogen chloride from the exhaust gas discharged from the step of producing the polysilicon. As the above purge gas, therefore, use is made of hydrogen which also is a gaseous component in the exhaust gas.

The present invention was accomplished under the above circumstances. Namely, it is an object of the present invention to provide a method wherein at the time of desorbing the hydrogen chloride, by using a hydrogen gas as the purge gas, from the active carbon layer that has adsorbed and held the hydrogen chloride, the hydrogen is recovered from the exhaust purge gas that contains the hydrogen chloride and hydrogen, and the hydrogen is reused.

Means for Solving the Problems

In view of the above problems, the present inventors have conducted a keen study. First, the inventors have paid attention to that hydrogen used as the purge gas is of a highly pure form. That is, in the step of producing the polysilicon, the gases that are flown in the step of production must be of a highly pure form if it is attempted to obtain the polysilicon in a very highly pure form such as of the grade of semiconductors. For instance, hydrogen which is the purge gas used at the time of desorbing the hydrogen chloride from the active carbon layer, too, must be of a highly pure form to a degree comparable to that of the hydrogen gas that is flown in the step of producing the polysilicon from the standpoint of preventing impurities from mixing into the exhaust gas that flows out from the active carbon layer used for refining the exhaust gas from the step of producing the polysilicon.

It was, therefore, attempted to desorb the hydrogen chloride from the active carbon layer that has adsorbed and held the hydrogen chloride by using the hydrogen gas as the purge gas, to bring the resulting exhaust purge gas containing the hydrogen chloride and hydrogen into contact with a solution for absorbing hydrogen chloride so that the hydrogen chloride was absorbed by the absorbing solution, and to recover the exhaust purge gas from which the hydrogen chloride has been removed. As a result, it was learned that the recovered gas was a gas containing hydrogen of a very highly pure form.

It was, further, attempted to compress the recovered gas and to use it as a hydrogen source for other production steps. As a result, it was discovered that the recovered gas could be used as a hydrogen source for the production of a so-called fumed silica by reacting, for example, tetrachlorosilane with hydrogen on a flame, and the present invention was completed.

The present invention provides a method of reusing hydrogen in an exhaust purge gas, comprising:

(1) a hydrogen chloride adsorption step of adsorbing the hydrogen chloride by passing, through an active carbon layer, the exhaust gas discharged from the step of producing the polysilicon by reacting hydrogen with a trichlorosilane;

(2) a hydrogen chloride desorption step of desorbing the adsorbed hydrogen chloride by passing a hydrogen gas as the purge gas through the active carbon layer that has adsorbed and held the hydrogen chloride;

(3) a hydrogen recovery step of obtaining the hydrogen gas from which the hydrogen chloride has been removed by bringing, into contact with a hydrogen chloride-absorbing solution, the exhaust purge gas that contains hydrogen and the hydrogen chloride desorbed in the above hydrogen chloride desorption step; and (4) a hydrogen feed step of compressing the hydrogen gas recovered in the above hydrogen recovery step and feeding the hydrogen gas as a hydrogen source for other steps.

In the invention of the method of reusing hydrogen, it is desired that:

(A) provision is made of a water washing step of washing with water the hydrogen gas recovered in the hydrogen recovery step prior to the hydrogen feed step;

(B) provision is made of a step of bringing the hydrogen gas washed with water in the water washing step into contact with a silane-trapping agent prior to the hydrogen feed step or during the compression in the hydrogen feed step and, thereafter, separating, from the hydrogen gas, the silane-trapping agent that accompanies the hydrogen gas;

(C) the silane-trapping agent is an organic solvent or an oil; and (D) provision is made of a dehumidifying step of removing the water content after the compression in the hydrogen feed step.

Effects of the Invention

Attempts have heretofore been made to effectively utilize the by-produced hydrogen chloride in the exhaust gas discharged from the step of producing the polysilicon by passing it through the steps of adsorbing the hydrogen chloride, desorbing the hydrogen chloride with hydrogen, and absorbing and recovering the hydrogen chloride. Hydrogen in the exhaust gas, too, has been utilized by being circulated after having removed the hydrogen chloride by adsorption. However, hydrogen in the exhaust purge gas discharged at the time of desorbing the adsorbed hydrogen chloride was not utilized but was disposed of.

The present invention now makes it possible to recover hydrogen of a highly pure form from the exhaust purge gas, to reuse it as a hydrogen source for other production steps and, therefore, contributes to greatly decreasing the disposal cost and production cost.

BRIEF DESCRIPTION OF THE DRAWING

FIG. 1 is a flowchart illustrating the steps of the present invention.

MODE FOR CARRYING OUT THE INVENTION

The present invention has a feature in that the hydrogen chloride in the exhaust gas is adsorbed, the exhaust gas containing the by-produced hydrogen chloride that is discharged from a step of producing the polysilicon by reacting hydrogen with a trichlorosilane, the hydrogen chloride is desorbed from the active carbon layer that is adsorbing and holding the hydrogen chloride by purging the active carbon layer with a hydrogen gas, hydrogen is recovered from the exhaust purge gas that contains hydrogen and the hydrogen chloride that is discharged, and the recovered hydrogen is reused as a hydrogen source for other manufacturing steps. The method of reusing hydrogen according to the invention will now be described.

<Production of Polysilicon>

In the invention, the method of producing polysilicon is a method of depositing polysilicon by reacting hydrogen with a trichlorosilane. There is no special limitation on the structure of the reaction apparatus or on the reaction conditions, and any known reaction apparatus and reaction conditions can be employed. A representative method may be the Siemens' method. The Siemens' method is a method that uses a silicon filament as a heating material, flows an electric current thereto to heat it at 900 to 1250° C., and feeds the trichlorosilane together with hydrogen onto it so that silicon deposits on the filament to thereby obtain a polysilicon rod that has grown up. The exhaust gas discharged from the step of producing polysilicon is a mixed gas containing hydrogen, unreacted trichlorosilane, and silane compounds such as monosilane, monochlorosilane, dichlorosilane and tetrachlorosilane which are by-products of the reaction, as well as hydrogen chloride.

<Removal of Silanes from the Exhaust Gas>

Upon passing the exhaust gas discharged from the above production step through the active carbon layer, the hydrogen chloride in the exhaust gas can be adsorbed by the active carbon to remove the hydrogen chloride from the exhaust gas. However, silanes in general are more strongly adsorbed by the active carbon than the hydrogen chloride. Therefore, removing the hydrogen chloride from the exhaust gas by passing the exhaust gas directly through the active carbon layer cannot be said to be industrially efficient since the effect for removing hydrogen chloride by the active carbon is low. From the standpoint of efficiently removing the hydrogen chloride from the exhaust gas, therefore, it is desired to remove silanes in advance prior to flowing the exhaust gas through the active carbon layer.

To remove silanes from the exhaust gas, any known method can be suitably employed without special limitation. Concrete examples of the method of removing silanes include a condensation removal method in which the exhaust gas is cooled to condense silanes which are then removed from the exhaust gas; an adsorption removal method by using active carbon; and a method of a combination of the condensation removal method and the adsorption removal method. Specifically, the method of a combination of the condensation removal method and the adsorption removal method is preferred because of its high effect for removing silanes from the exhaust gas.

At the time of removal by condensation, the exhaust gas may be cooled down to a temperature lower than the temperature at which the silanes condense. Namely, the cooling temperature may be suitably determined by taking the cooling capability of the cooling apparatus and the like into account. Usually, it is sufficient if the cooling temperature for removing silanes from the exhaust gas is not higher than −10° C. and, preferably, not higher than −30° C. As for the pressure for the removal by condensation, there is no special limitation if the silanes can be sufficiently removed. Namely, the pressure may be suitably determined by taking the capability of the condensation removal apparatus and the like into account. It is, usually, sufficient if the pressure is not lower than 300 kPaG and, preferably, not lower than 500 kPaG.

The method of removing silanes from the exhaust gas by adsorption by using active carbon can be conducted by, for example, passing the exhaust gas through an adsorption tower filled with active carbon. In this case, silanes that can be highly adsorbed by the active carbon are predominantly adsorbed by the active carbon and, therefore, the gas discharged from the tower filled with active carbon is a gas containing chiefly hydrogen and the hydrogen chloride.

There is no special limitation on the active carbon used for removing silanes by adsorption provided it is capable of removing silanes by adsorption, and any known active carbon can be used. Active carbons having various average pore radii are industrially available. As the active carbon for removing silanes by adsorption, however, it is sufficient if the active carbon has an average pore radius (R) in a range of $1 \times 10^{-9}$ m to $3 \times 10^{-9}$ m. Here, the average pore radius (R) in the invention stands for a pore radius that exhibits a maximum peak on a pore profile curve obtained by the water vapor adsorption method.

As for the adsorption temperature and adsorption pressure in the removal of silanes by adsorption by using active carbon, there is no special limitation if the temperature and pressure are suited for removing silanes by adsorption to a sufficient degree. Namely, the temperature and pressure may be suitably determined by taking into account the capability of the active carbon-filled tower that removes silanes by adsorption. Usually, it is sufficient if the adsorption temperature is −30 to 50° C. and, preferably, −10 to 30° C. and if the adsorption pressure is not less than 300 kPaG and, preferably, not less than 500 kPaG.

The silanes that are removed by condensation or the silanes that are recovered by being desorbed from the active carbon layer that has adsorbed them, are, usually, refined by distillation and, as required, can be reused as a starting material for deposition in the step of producing the polysilicon.

<Removing the Hydrogen Chloride from the Exhaust Gas>

The exhaust gas discharged from the step of producing the polysilicon is passed through the active carbon layer where the hydrogen chloride in the exhaust gas is adsorbed by the active carbon so as to be removed. When the active carbon adsorption method is used for removing silanes from the exhaust gas, the silanes that can be highly adsorbed by the active carbon are predominantly adsorbed, and the hydrogen chloride contained in the exhaust gas is discharged together with hydrogen. Upon passing the exhaust gas from which the silanes have been removed through the active carbon layer again, therefore, the hydrogen chloride in the exhaust gas can be adsorbed by the active carbon and can, therefore, be removed from the exhaust gas.

Upon removing the silanes from the exhaust gas in the preceding step, the silanes have now been almost all removed from the exhaust gas. However, the silanes may often remain in very small amounts in the exhaust gas. In this case, the silanes are adsorbed together with the hydrogen chloride in this step.

There is no special limitation on the active carbon used for removing the hydrogen chloride from the exhaust gas by adsorption if it is capable of removing the hydrogen chloride by adsorption, and a known active carbon can be used. The active carbons having various average pore radii (R) are industrially available. As the active carbon used for removing the hydrogen chloride by adsorption, however, it is sufficient if the active carbon has an average pore radius (R) in a range of $5 \times 10^{-10}$ m to $1 \times 10^{-9}$ m. Specifically, use of the active carbon having an average pore radius (R) in a range of $5 \times 10^{-10}$ m to $8 \times 10^{-10}$ m is preferred from the standpoint of a high capability for removing the hydrogen chloride by adsorption. There is no specific limitation, either, on the shape of the active carbon used for removing the hydrogen chloride by adsorption, and there can be used the active carbon of a granular shape, honeycomb shape or fibrous shape that is industrially available. Specifically, the granular one is preferred since it can be filled in the tower in an increased amount per a unit volume.

There is no special limitation on the adsorption temperature and adsorption pressure for removing the hydrogen chloride by adsorption if the hydrogen chloride can be removed by adsorption to a sufficient degree. Namely, the adsorption temperature and adsorption pressure may be suitably determined by taking into account the capability of the active carbon-filled tower that removes the hydrogen chloride by adsorption. Usually, the adsorption temperature is in a range of not higher than 50° C. and, preferably, in a range of not higher than 30° C., and the adsorption pressure is not lower than 300 kPaG and, preferably, not lower than 500 kPaG. There is no special limitation on the rate of flowing the exhaust gas through the active carbon layer if the hydrogen chloride can be removed from the exhaust gas by adsorption to a sufficient degree. Namely, the rate of flow may be suitably determined by taking into account the capability of the active carbon-filled tower that removes the hydrogen chloride by adsorption. Usually, it is sufficient if the space velocity (SV) is 50 to 500 $Hr^{-1}$ and, preferably, 50 to 150 $Hr^{-1}$.

Upon removing the hydrogen chloride by adsorption by using the active carbon layer, the amount of the hydrogen chloride in the exhaust gas discharged from the active carbon layer can be decreased to be not more than 0.01% by volume and not more than 0.005% by volume under more desired operation conditions.

To industrially continue the operation for removing the hydrogen chloride by adsorption by using the active carbon layer, it is necessary to consecutively carry out the adsorption steps by providing a plurality of towers filled with the active carbon, and by alternately conducting the adsorption step of adsorbing the hydrogen chloride in the exhaust gas by the active carbon layers in the active carbon-filled towers and the hydrogen chloride desorption step of desorbing the hydrogen chloride adsorbed by the active carbon layers. For example, two towers are installed, the one tower conducting the step of adsorption while the other tower conducting the step of desorbing the hydrogen chloride. Or three towers may be installed, the one tower conducting the step of adsorption and the other two towers conducting the step of desorbing the hydrogen chloride. Moreover, four or more towers can be installed. When the polysilicon is produced in large amounts, each tower may have an increased capacity, or a plurality of towers may be used in parallel.

When the plurality of towers are installed and are operated to continue the step of adsorption by alternately switching the step of adsorption and the step of regeneration by desorption, the timing for switching the step of adsorption and the step of desorbing the hydrogen chloride in each tower may be such that the times of the step of adsorption and the step of desorbing the hydrogen chloride are set in advance and, after a predetermined period of time has passed, the step of adsorption is switched to the step of desorbing the hydrogen chloride or the step of desorbing the hydrogen chloride is switched to the step of adsorption. Or the exhaust gas discharged from the active carbon layer in the tower is analyzed and monitored at all times for its hydrogen chloride content by gas chromatography or the like, and the steps are switched at a moment when a predetermined content is reached.

<Exhaust Gas Discharged from the Active Carbon Layer>

The exhaust gas discharged from the active carbon layer is a hydrogen gas of a high purity and can be utilized in its own form being circulated as hydrogen for the step of producing polysilicon. As will be described later, further, the exhaust gas can be also used as a purge gas for desorbing the hydrogen chloride from the active carbon layer that is adsorbing and holding the hydrogen chloride contained in the by-produced hydrogen chloride-containing exhaust gas, or can be used as hydrogen for the reaction of reducing the tetrachlorosilane to the trichlorosilane, or as a hydrogen source in the production of silica by using the tetrachlorosilane as a starting material.

<Hydrogen Chloride Desorption Step>

The hydrogen chloride removed from the exhaust gas has been adsorbed and held by the active carbon layer being condensed at a high concentration. Upon conducting the step of desorbing the hydrogen chloride, the hydrogen chloride is desorbed from the active carbon layer which, therefore, is regenerated. The regenerated active carbon layer can be used again for removing the hydrogen chloride from the exhaust gas that contains the by-produced hydrogen chloride. The step of desorbing the hydrogen chloride is conducted by flowing a hydrogen gas as the purge gas through the active carbon layer that is adsorbing and holding the hydrogen chloride. As a result, the exhaust purge gas discharged from the active carbon layer contains the hydrogen chloride and hydrogen.

In case silanes remains in trace amounts in the exhaust gas of before the hydrogen chloride is removed, the silane of trace amounts is adsorbed by the active carbon together with the hydrogen chloride in the step of removing the hydrogen chloride. Therefore, the silanes could be contained in the exhaust purge gas after the step of desorbing the hydrogen chloride.

There is no special limitation on the conditions for desorbing the hydrogen chloride provided the hydrogen chloride can be desorbed from the active carbon layer, and the conditions may be property determined by taking the capacity of the tower and the like into consideration. The hydrogen chloride is desorbed from the active carbon layer, usually, under the operation conditions of 10 to 300° C. and not higher than 200 kPaG while flowing hydrogen. To enhance the hydrogen chloride desorption efficiency, in particular, it is desired to flow hydrogen under the operation conditions of 150° C. to 250° C. and not higher than 100 kPaG. There is no special limitation on the rate of flowing hydrogen as the purge gas into the active carbon layer if the hydrogen chloride adsorbed and held by the active carbon layer can be desorbed therefrom to a sufficient degree, and the rate of flow may be properly determined by taking the capacity of the tower and the like into consideration. Usually, the space velocity (SV) may be suitably determined in a range of 1 to 50 $Hr^{-1}$ and, preferably, 1 to 20 $Hr^{-1}$.

There is no special limitation on the purity of hydrogen used as the purge gas, and hydrogen that is industrially available can be directly used. If impurities are contained in hydrogen used as the purge gas, however, it is probable that the impurities may be adsorbed by the active carbon in the step of desorbing the hydrogen chloride. If the regenerated active carbon layer adsorbing the impurities is used again for removing the hydrogen chloride from the exhaust gas containing the by-produced hydrogen chloride, it is probable that the exhaust gas discharged from the active carbon layer is contaminated with the impurities. To prevent the gas discharged from the active carbon layer from being contaminated through the active carbon layer, therefore, it is desired to use hydrogen of a high purity. As such hydrogen, there can be preferably used hydrogen that is used in the step of producing the polysilicon or the exhaust gas from which the hydrogen chloride is removed by passing the by-produced hydrogen chloride-containing exhaust gas through the active carbon layer.

The exhaust purge gas discharged from the step of desorbing the hydrogen chloride can be measured for its content of hydrogen chloride by such analytical means as gas chromatography.

The hydrogen chloride (often contains silanes) starts discharged accompanying the start of desorption, and its content gradually decreases down to arrive at the completion of desorption. Therefore, the hydrogen chloride may be desorbed by analyzing and monitoring the content of hydrogen chloride in the exhaust purge gas at all times relying on the above analytical means, and flowing the purge gas until no hydrogen chloride is detected in the exhaust gas.

<Recovery of Hydrogen>

The hydrogen chloride and hydrogen are contained in the exhaust purge gas discharged from the step of desorbing the hydrogen chloride. According to the invention, the exhaust purge gas is brought into contact with a solution for absorbing the hydrogen chloride so that the hydrogen chloride is absorbed by the absorbing solution to thereby remove the hydrogen chloride, and hydrogen is recovered. As the hydrogen chloride-absorbing solution, there is no special limitation if it is a solution for absorbing the hydrogen chloride in the exhaust purge gas, and any known hydrogen chloride-absorbing solution can be used.

Concrete examples of the hydrogen chloride-absorbing solution include acid aqueous solutions such as hydrochloric acid aqueous solution and the like solution; alkaline aqueous solutions in which is dissolved an alkali such as sodium hydroxide, potassium hydroxide or calcium hydroxide; and water. Among these hydrogen chloride-absorbing solutions, an alkali aqueous solution is preferably used from such a standpoint that the hydrogen chloride can be efficiently removed from the exhaust purge gas by the neutralization reaction. Further, when the hydrochloric acid aqueous solution is used as the hydrogen chloride-absorbing solution, the hydrogen chloride in the exhaust purge gas is contained in the absorbing solution in the form of hydrochloric acid. Upon desorbing and drying the liquid that has absorbed the hydrogen chloride, therefore, the hydrogen chloride can be reused as the hydrogen chloride for preparing, for example, a trichlorisilane.

There is no special limitation on the method of bringing the exhaust purge gas into contact with the hydrogen chloride-absorbing solution provided the exhaust purge gas can be brought in contact with the hydrogen chloride-absorbing solution to a sufficient degree and the hydrogen gas can be removed from the exhaust gas. Namely, there can be used any known vapor-liquid contacting method. As the vapor-liquid contacting method, there can be concretely exemplified a method of forcibly forming a vapor-liquid mixed flow of the exhaust purge gas and the hydrogen chloride-absorbing solution using an ejector or the like; a method of sprinkling the hydrogen chloride-absorbing solution onto the exhaust purge gas flow using a scrubber or the like; and a method of directly blowing the exhaust purge gas into a liquid phase which comprises the hydrogen chloride-absorbing solution. Among the above vapor-liquid contacting methods, it is desired to use the method of sprinkling the hydrogen chloride-absorbing solution onto the exhaust purge gas flow using a scrubber or the like from the standpoint of easiness in discharging the exhaust purge gas after it has come in contact with the hydrogen chloride-absorbing solution and simplicity of the apparatus.

There is no special limitation on the temperature at the time of bringing the exhaust purge gas in contact with the hydrogen chloride-absorbing solution. If the temperature is too high, however, the hydrogen chloride, acid and alkali tend to be desorbed from the solution, and tend to flow accompanying the exhaust purge gas. At the time of bringing the exhaust purge gas into contact with the hydrogen chloride-absorbing solution, therefore, it is desired that the temperature is in a range of 10 to 60° C.

<Hydrogen Feed Step>

Upon removing the hydrogen chloride from the exhaust purge gas, the hydrogen chloride is nearly completely removed from the exhaust gas. As a result, the exhaust purge gas becomes a hydrogen gas having a purity high enough for being reused as a hydrogen source for other steps that will be described later. Upon having been brought in contact with the hydrogen chloride-absorbing solution, however, the pressure of the exhaust purge gas becomes nearly equal to the atmospheric pressure. To feed the hydrogen gas from which the hydrogen chloride has been removed as the hydrogen source for the other steps, therefore, it is necessary to compress hydrogen by a compressing means.

There is no special limitation on the means for compressing hydrogen, and any known compressing means can be employed. As such compressing means, there can be concretely exemplified a centrifugal compressor, a turbo compressor such as axial flow compressor, a reciprocal compressor, a diaphragm type compressor, a screw compressor, and a displacement compressor such as rotary compressor. There can be, further, used a compressor of either the oil-cooled type which continues the operation while injecting a lubricating oil into the compressing part of the compressor or the oilless type which uses no lubricating oil. Among these compressing means, the screw compressor is particularly preferred since it is capable of efficiently compressing the hydrogen gas. As the lubricating oil used for the compressor of the oil-cooled type, there can be concretely exemplified paraffin type oil, naphthene type oil, halogenated hydrocarbon type oil and silicone type oil.

When the oil-cooled compressor means is used, the lubricating oil is separated from the hydrogen gas after it has been compressed, and the hydrogen gas is used as a hydrogen source for other production steps. There is no special limitation on the method of separating the lubricating oil from the hydrogen gas after it has been compressed provided the lubricating oil can be separated, and any known separating means can be used. As such separating means, there can be concretely used a demister, oil mist filter or a separation means using active carbon.

There is no special limitation on the pressure for compressing the hydrogen gas provided the hydrogen gas is compressed to such a degree that it can be used as a hydrogen source for other steps, and the pressure may be properly determined by taking into consideration the capacity for feeding hydrogen to the production apparatus in other steps. Usually, it is sufficient if the hydrogen gas is compressed to have a pressure of 200 to 600 kPaG. The hydrogen gas is compressed through a series of compressing means, and is fed as a hydrogen source for other production steps.

<Water Washing Step>

The hydrogen gas recovered from the exhaust purge gas is a hydrogen gas having a purity high enough for being reused as a hydrogen source for other steps. Upon contacted to the hydrogen chloride-absorbing solution, however, the water content from the hydrogen chloride-absorbing solution often accompanies or the components (acids, alkalis, etc.) in the hydrogen chloride-absorbing solution are often contained in trace amounts. If these components could become a problem in the other production steps, then it is desired to provide a water washing step of washing the hydrogen gas with water prior to the step of compressing the hydrogen gas discharged after contacted to the hydrogen chloride-absorbing solution in order to remove the components stemming from the hydrogen chloride-absorbing solution.

There is no special limitation on the method of contacting the hydrogen gas to the water for washing provided the hydrogen gas is brought into contact with the water to a sufficient degree to remove the components from the hydrogen chloride-absorbing solution, and any known vapor-liquid contacting method can be used. As the vapor-liquid contacting method, there can be concretely exemplified a method of forcibly forming a vapor-liquid mixed flow of the hydrogen gas and the water using an ejector or the like; a method of sprinkling the water onto the hydrogen gas flow using a scrubber or the like; and a method of directly blowing the hydrogen gas into the water. Among the above vapor-liquid contacting methods, it is desired to use the method of sprinkling the water onto the hydrogen gas using a scrubber or the like from the standpoint of easiness in discharging the hydrogen gas after it has come in contact with the water and simplicity of the apparatus. These vapor-liquid contacting methods can be used alone, being connected in series, or a plurality of the vapor-liquid contacting methods can be used in combination.

<Step of Separating the Residual Silanes>

Trace amounts of silanes may often be contained in the exhaust purge gas. Most of the silanes that are contained undergo the reaction with the water in the hydrogen chloride-absorbing solution or with the water in the water washing step, and turn into by-products such as silica and the like and are separated from the hydrogen gas. However, part of them does not react with water and accompanies the hydrogen gas to undergo the reaction with the water content in the hydrogen gas and, hence, forming by-products such as silica, etc. on the way up to the subsequent steps. Besides, the formed by-products scatter and cause clogging in the compressor and in the piping.

Desirably, therefore, the hydrogen gas washed with water in the water washing step is brought into contact with a silane-trapping agent prior to the hydrogen feed step or during the compression in the hydrogen feed step and, thereafter, the silane-trapping agent that accompanies the hydrogen gas is separated therefrom enabling the silanes or the by-products stemming from the silanes to be dissolved or suspended in the silane-trapping agent to thereby separate and remove the silanes from the hydrogen. In the invention, the silane-trapping agent is the one that dissolves or suspends therein the silanes such as monosilane, monochlorosilane, dichlorosilane, tetrachlorosilane and trichlorosilane and decomposed products thereof, as well as by-products stemming from the silanes so that they can be separated from the hydrogen gas.

The silane-trapping agent may be the one that is inert to hydrogen, is capable of dissolving or suspending therein the silanes, decomposed products thereof or by-products stemming therefrom, and may be properly determined by taking into consideration the material of the piping, kind and materials of the compressor in the subsequent step. For example, there can be used an organic solvent or an oil. As the organic solvent, there can be concretely and preferably used hexane, heptane, alcohol or acetone. As the oil, there can be exemplified a lubricating oil used for the above-mentioned compressor of the oil-cooled type, such as paraffin type oil, naphthene type oil, halogenated hydrocarbon type oil or silicone oil. Concretely, there can be used "KB-310-46" (produced by Kobe Seikosho Co.) and "Daffny Alpha-Screw 32" (produced by Idemitsu Kosan Co.).

The silane-trapping agent can be used alone. Or a plurality of organic solvents and oils can be used being mixed together. When the oil-cooled compression means is used for the compression in the hydrogen feed step as described above, the residual silanes can be separated depending upon the lubricating oil that is used, and the step of contacting with the silane-trapping agent and the hydrogen compression step can be grouped into one establishing a preferred embodiment.

In the invention, the silane-trapping agent may be brought in contact with the hydrogen gas after washed with water in the water washing step either prior to the hydrogen feed step or during the compression in the hydrogen feed step. As for the method of contacting the hydrogen gas and the silane-trapping agent together, further, it will suffice if the silanes remaining in the hydrogen gas are dissolved or suspended in the silane-trapping agent, and any known contacting method can be employed.

Concrete examples of the contacting method include a method of spraying the silane-trapping agent into the hydrogen gas to contact them together; a method of feeding the hydrogen gas into the silane-trapping agent to contact them together; and a method of blowing the hydrogen gas into the liquid flow of the silane-trapping agent to contact them together. As described above, the hydrogen gas and the lubricating oil can be contacted together in the compressor of the oil-cooled type. When there is used a compressor of the type that uses no lubricating oil, the hydrogen gas must be fed to the compressor after the silane-trapping agent has been removed.

The hydrogen gas that has contacted to the silane-trapping agent is, usually, accompanied by the silane-trapping agent. By removing the accompanying silane-trapping agent from the hydrogen gas, therefore, the hydrogen gas can be fed as a hydrogen source for other production steps. To separate the accompanying silane-trapping agent, a known separating method can be used. Concretely, there is used such a separation means as demister, oil mist filter or active carbon.

<Dehumidifying Step>

The hydrogen gas recovered from the exhaust purge gas is a gas that has passed through the hydrogen chloride-absorbing solution and the water washing step and, therefore, contains water in a trace amount. Therefore, if the water content contained in the hydrogen gas could cause a problem in using the hydrogen gas as a hydrogen source for other production steps, it is desired to provide a dehumidifying step for removing the water content from the hydrogen gas.

As means for removing the water content from the hydrogen gas, any known removing means can be used. Concretely, there can be used means for condensing and removing the water content by cooling the hydrogen gas and means for removing the water content by passing the hydrogen gas through a drying agent-filled layer, such as molecular sieves. These water content-removing means can be used alone or being connected in series, or a plurality of water content-removing means can be used in combination. Upon providing the dehumidifying step, the amount of water content in the hydrogen gas can be decreased to be about 100 to about 500 ppm.

<Use as a Hydrogen Source for Other Steps>

The hydrogen gas recovered from the exhaust purge gas by the method of the present invention has a purity high enough for being reused as a hydrogen source for other steps. For instance, the hydrogen gas can be used as a hydrogen source for other steps, such as a hydrogen source for the production of the so-called fumed silica or as a hydrogen source for producing the hydrogen chloride by being reacted with chlorine.

EXAMPLES

The invention will be further described by way of Examples to which only, however, the invention is in no way limited. Further, it does not mean that the combinations of features described in Examples are all essential for solving the problems of the invention.

Example 1

Preparation of Exhaust Purge Gas

A polysilicon was produced by using a bell jar of the known Siemens' method. Here, the temperature for depositing the polysilicon was 1150° C., and the deposition was conducted by feeding a mixed gas of hydrogen of 30 Nm$^3$/Hr and a trichlorosilane of 18 kg/Hr under a pressure of 50 kPaG for 4 hours so that the surface area of deposition was about 1200 cm$^2$ on the average. The exhaust gas discharged from the bell jar was cooled through a heat exchanger, pressurized up to 700 kPaG through a compressor, and was, further, cooled again down to −50° C. to partly remove the silanes by condensation. Next, the temperature of the gas was elevated to 10° C. through a heat exchanger. Thereafter, the gas was fed into a tower filled with 15 L of granular active carbon having an average pore radius of 1.2×10$^{-9}$ m and a diameter of 3 to 5 mm at a space velocity (SV) of 10 Hr$^{-1}$ to adsorb and remove the silanes residing in the gas.

To adsorb and remove the hydrogen chloride from the exhaust gas from which the silanes have been removed by adsorption, there were provided two towers each filled with 15 L of granular active carbon having an average pore radius of 8×10$^{-10}$ m and a diameter of 3 to 5 mm. To one of the two towers, the silanes-free gas but containing the by-produced hydrogen chloride was fed at a space velocity (SV) of 50 Hr$^{-1}$.

After the exhaust gas was fed to the above tower for 4 hours, feeding the gas was switched. The hydrogen gas from which the by-produced hydrogen chloride has been removed was flown through the active carbon-filled tower that has adsorbed and held the hydrogen chloride at 200° C., under 3 kPaG and at a space velocity (SV) of 3 Hr$^{-1}$ for 4 hours to desorb the hydrogen chloride. The exhaust purge gas discharged from the active carbon-filled tower possessed an average composition as described below.

Average Composition of the Exhaust Purge Gas:
  Hydrogen: 99.8% by volume
  Hydrogen chloride: 0.2% by volume (max. of 30% by volume)
  Silanes: <400 ppm
  Note) The amount of silanes is the total amount of the above silanes.

<Recovering Hydrogen from the Exhaust Purge Gas>

The exhaust purge gas was fed to a scrubber, and an NaOH aqueous solution of pH 13 was brought in contact therewith at a liquid/gas ratio of 50 L/Nm$^3$. The hydrogen gas discharged from the scrubber was washed with water, and was compressed up to 450 kPaG by an oil-cooled screw compressor using a paraffin-type oil "KB-310-46" (produced by Kobe Seikosho Co.). The compressed hydrogen gas was passed through a demister, an oil mist filer and active carbon to remove the oil therefrom. The hydrogen gas from which the oil has been removed was passed through a molecular sieve to remove the water content therefrom. The recovered hydrogen possessed a purity of not lower than 99.99% by volume. The content of silanes was less than 1 ppm. It was confirmed that the solid matters had been deposited on the demister and on the oil mist filter.

Example 2

The exhaust purge gas obtained in Example 1 above was fed to the scrubber, and an NaOH aqueous solution of pH 13 was brought in contact therewith at a liquid/gas ratio of 50 L/Nm$^3$. The hydrogen gas discharged from the scrubber was washed with water. Thereafter, the paraffin-type oil "KB-310-46" (produced by Kobe Seikosho Co.) was sprayed thereon so as to be contacted thereto. The hydrogen gas that was brought in contact with the paraffin-type oil was passed through the demister and the oil mist filter to separate the accompanying paraffin-type oil therefrom, and was compressed up to 450 kPaG by using an oil-cooled compressor. The compressed hydrogen gas was passed again through the demister, oil mist filter and active carbon, and from which the water content was removed by using the molecular sieve. The recovered hydrogen possessed a purity of not lower than 99.99% by volume. The content of silanes was less than 1 ppm. Solid matters were confirmed being deposited on the demister and the oil mist filter of before the oil-cooled compressor. However, almost no solid matter was confirmed to have been deposited on the demister and the oil mist filter in the stage after the oil-cooled screw compressor.

Example 3

Tetrachlorosilane, hydrogen recovered in Example 1 above and the air were pre-mixed together at a volume ratio of 2:5:14. The pre-mixed gas was continuously fed into a cylindrical reactor from an upper end thereof, and was subjected to the combustion reaction by using a multiple tube burner. Here, the pre-mixed gas was fed from the inner pipe of the multiple pipe burner. As a seal gas, the air was fed from the outer pipe while a mixed gas of hydrogen and air was fed from the inner side thereof. The obtained fumed silica possessed a BET specific surface area and a bulk density as described below. The BET specific surface area was measured based on a gas adsorption BET-point method. The bulk density was calculated by leaving about 1 L of the fumed silica to stand still for 30 minutes and measuring the weight. The iron concentration and the aluminum concentration were measured by the ICP emission spectroscopy after having properly pre-treated 2 g of the fumed silica.
  BET specific surface area: 220 m$^2$/g
  Bulk density: 25 g/L Example 4

Preparation of Exhaust Purge Gas

Exhaust purge gas was prepared by the same method as that of Example 1 using the same apparatus as that of Example 1 but setting the temperature at −30° C. for condensing and removing the silanes. The exhaust purge gas discharged from the active carbon-filled tower underwent a change with the passage of time and possessed average compositions in 4 hours as described below. Change of the exhaust purge gas with the passage of time:

|  | Hydrogen chloride [vol %] | Silanes [ppm] |
| --- | --- | --- |
| 30 Min. after start | 36.0 | 50 |
| 1 Hour after start | 8.8 | 420 |
| 2 Hours after start | 2.7 | 400 |
| 3 Hours after start | 0.1 | 20 |
| 4 Hours after start | 0.0 | 0 |

Average Composition of the Exhaust Purge Gas in 4 Hours:
  Hydrogen: 95.0% by volume
  Hydrogen chloride: 5.0% by volume
  Silanes: 210 ppm
  Note) The amount of silanes is the total amount of the above silanes <Recovery of Hydrogen from the Exhaust Purge Gas>

Hydrogen was recovered by the same method as that of Example 1 to find that the recovered hydrogen possessed a purity of not lower than 99.99% by volume. The content of silanes was less than 1 ppm. It was confirmed that the solid matters had been deposited on the demister and on the oil mist filter.

Example 5

A fumed silica was produced by the same method as that of Example 3 but using the tetrachlorosilane and hydrogen recovered in the above Example 4. The obtained fumed silica possessed a BET specific surface area and a bulk density as described below
  BET specific surface area: 220 m$^2$/g
  Bulk density: 25 g/L Reference Example 1

In producing the fumed silica, a fumed silica was produced under quite the same conditions as those of Example 3 but using a virgin hydrogen gas (purity of not lower than 99.99% by volume) instead of using the exhaust gas. The obtained fumed silica exhibited the following properties.
  BET specific surface area: 220 m$^2$/g
  Bulk density: 25 g/L
  A comparison of the results of Example 3 with the results of Reference Example 1 tells that according to the present invention which uses hydrogen recovered from the exhaust purge gas, a fumed silica is obtained having an average grain size, a specific surface area and a high purity comparable to those of when the virgin hydrogen gas is used.

The invention claimed is:
1. A method of reusing hydrogen in an exhaust purge gas, comprising:
  (1) a hydrogen chloride adsorption step of adsorbing the hydrogen chloride by passing, through an active carbon layer, the exhaust gas discharged from a step of producing polysilicon by reacting hydrogen with a trichlorosilane;
  (2) a hydrogen chloride desorption step of desorbing the adsorbed hydrogen chloride by passing a hydrogen gas as the purge gas through the active carbon layer that has adsorbed and held the hydrogen chloride;

(3) a hydrogen recovery step of obtaining the hydrogen gas from which the hydrogen chloride has been removed by bringing, into contact with a hydrogen chloride-absorbing solution, the exhaust purge gas that contains hydrogen and the hydrogen chloride desorbed in said hydrogen chloride desorption step; and (4) a hydrogen feed step of compressing the hydrogen gas recovered in said hydrogen recovery step and feeding the hydrogen gas as a hydrogen source for other steps, wherein said method further comprises a water washing step of washing with water the hydrogen gas recovered in the hydrogen recovery step prior to the hydrogen feed step, and a step of bringing the hydrogen gas washed with water in the water washing step into contact with a silane-trapping agent prior to the hydrogen feed step or during the compression in the hydrogen feed step and, thereafter, separating, from the hydrogen gas, the silane-trapping agent that accompanies the hydrogen gas.

2. The method of reusing hydrogen according to claim 1, wherein the silane-trapping agent is an organic solvent or an oil.

3. The method of reusing hydrogen according to claim 1, further comprising a dehumidifying step of removing water after the compression in the hydrogen feed step.

4. A method of reusing hydrogen in an exhaust purge gas, comprising:

(1) a hydrogen chloride adsorption step of adsorbing the hydrogen chloride by passing, through an active carbon layer, the exhaust gas discharged from a step of producing polysilicon by reacting hydrogen with a trichlorosilane;

(2) a hydrogen chloride desorption step of desorbing the adsorbed hydrogen chloride by passing a hydrogen gas as the purge gas through the active carbon layer that has adsorbed and held the hydrogen chloride;

(3) a hydrogen recovery step of obtaining the hydrogen gas from which the hydrogen chloride has been removed by bringing, into contact with a hydrogen chloride-absorbing solution, the exhaust purge gas that contains hydrogen and the hydrogen chloride desorbed in said hydrogen chloride desorption step; and (4) a hydrogen feed step of compressing the hydrogen gas recovered in said hydrogen recovery step and feeding the hydrogen gas as a hydrogen source for other steps, wherein said method further comprises a water washing step of washing with water the hydrogen gas recovered in the hydrogen recovery step prior to the hydrogen feed step.

* * * * *